June 9, 1953 H. L. RUMSEY ET AL 2,641,420

WIRE REEL FOR MAGNETIC WIRE RECORDERS

Filed April 16, 1949

INVENTORS.
Matthew C. Abbott
BY Howard L. Rumsey
A. B. Richardson
Attorney

Patented June 9, 1953 2,641,420

UNITED STATES PATENT OFFICE 2,641,420

WIRE REEL FOR MAGNETIC WIRE RECORDERS

Howard L. Rumsey, Buffalo, N. Y., and Matthew C. Abbott, Greenwood, Mass., assignors, by mesne assignments, to Sylvania Electric Products Inc., New York, N. Y., a corporation of Massachusetts Application April 16, 1949, Serial No. 87,864

9 Claims. (Cl. 242—118)

Figures 1, 2, 3:
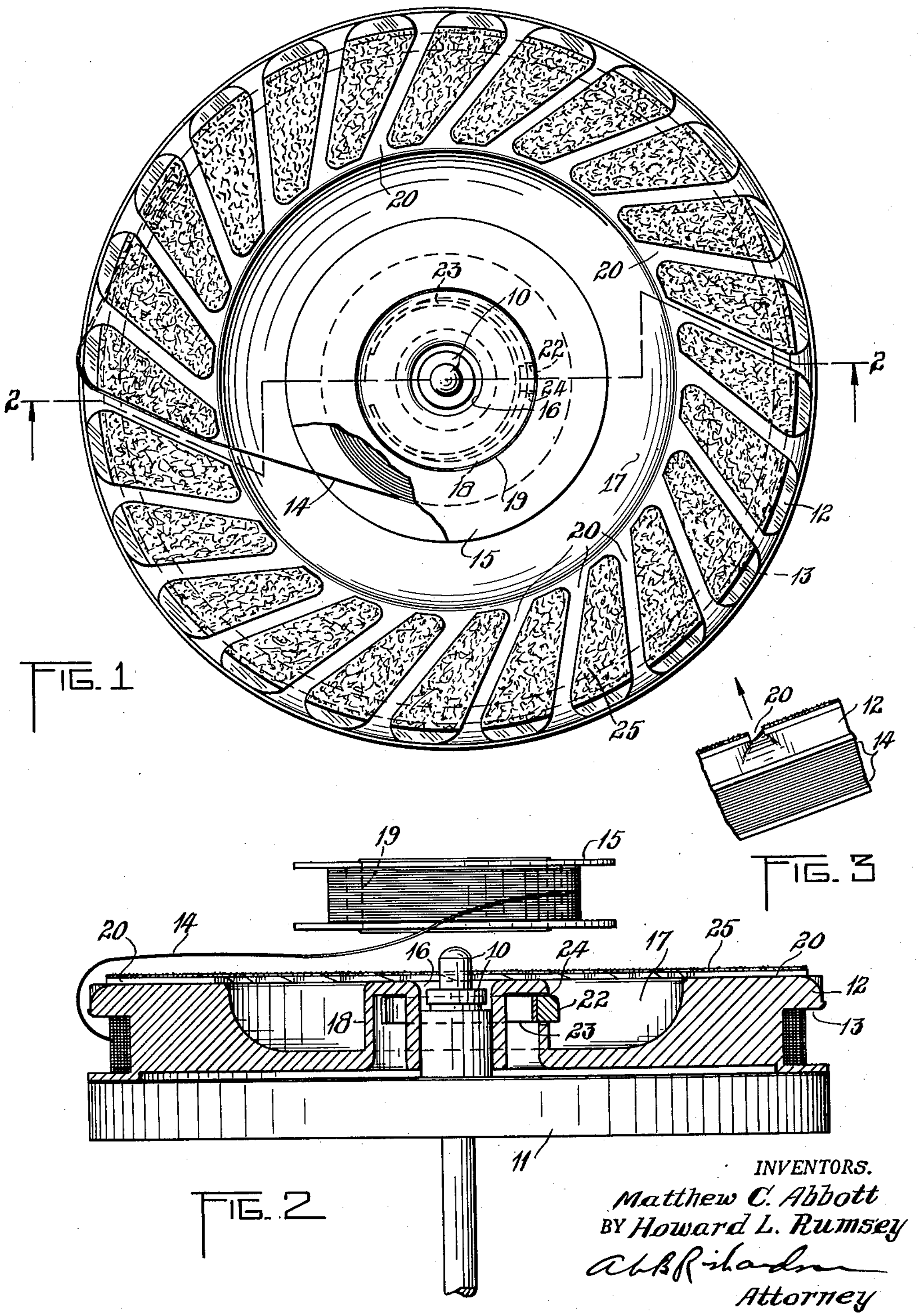

The present invention relates to magnetic wire recorders and, particularly, to a reel for temporarily or permanently storing a long and continuous length of partially used magnetic recording wire. In greater particular, the invention relates to a wire reel so constructed that two reels, having a continuous length of recording wire wound upon both thereof, may be easily and conveniently assembled in nested relation for removal from the recorder either as a temporary measure or for storage purposes.

Magnetic wire recorders conventionally are provided with two spindles, one to receive a storage reel normally loaded with a large number of turns of magnetic wire and the other to receive a take-up reel upon which the wire is wound during the normal recording or play-back operation. The wire in moving from the storage reel to the take-up reel passes across the pole shoes of a recording and play-back head structure which effects recording of sound upon the wire or which enables reproduction of sound previously recorded on the wire.

The magnetic wire conventionally used for recording purposes is of steel and has a very small diameter usually of the order of a few thousandths of an inch. A length of wire at least several thousand feet long is usually used to provide a minimum recording or play-back interval not less than one-half hour long. It frequently is desirable, however, to stop a recording or a play-back operation before the end of the recording wire is reached in order that the operation may be continued by use of another length of recording wire. This has heretofore usually required that the partially used length of wire be entirely rewound upon the storage reel.

To avoid the need for completely rewinding a partially used length of recording wire, it has heretofore been proposed that the storage and take-up reels be mounted in a magazine type of structure which permits both reels to be simultaneously placed upon or removed from the recorder. Since the storage and take-up reels are spaced some little distance apart in their normal operative positions on a conventional wire recorder, this magazine structure has the disadvantage that its physical bulk is necessarily much larger than desirable. Additionally, the spring-like quality of the recording wire makes it necessary to provide at each reel some arrangement for automatically locking the reel against angular rotation upon removal of the magazine from the recorder. This, of course, complicates the magazine structure, tends to reduce the reliability of its operation, and undesirably adds to the cost of an already costly structure.

It is an object of the present invention, therefore, to provide a new and improved wire reel which enables the removal of a partially used recording wire from a recorder and yet one which avoids one or more of the disadvantages and limitations of arrangements heretofore proposed for this purpose.

It is a further object of the invention to provide a novel wire reel, for a magnetic wire recorder, which permits removal from the recorder of a partially used wire without the necessity of breaking the wire or of rewinding it upon the storage reel, while at the same time providing a reel of simple and inexpensive structure having a minimum of physical bulk.

In accordance with the invention, a take-up wire reel for a magnetic wire recorder comprises a disc-like reel having a circumferential groove to receive a multiplicity of turns of magnetic wire, the reel having in one face thereof an annular depression to receive a storage reel of smaller diameter. The depression in the take-up reel has a centrally positioned hub which receives a centrally positioned bore of the storage reel when the latter is positioned within the depression in nested relation with the take-up reel. The take-up reel has in the one face thereof a plurality of grooves angularly extending from the periphery of the take-up reel to its annular depression to receive and anchor a length of unbroken wire wound upon both of the reels. The take-up reel also is provided with a spring-biased member for frictionally engaging the surface of the bore of the storage reel, when the latter is in nested relation with the take-up reel to restrain the tendency of the wire when wound taut between the reels to cause relative angular rotation of the reels in the nested relation.

For a better understanding of the present invention, together with other and further objects thereof, reference is had to the following description taken in connection with the accompanying drawing, and its scope will be pointed out in the appended claims.

Referring now to the drawing, Figure 1 illustrates in plan view a wire reel embodying the invention in such form that the reel is also suitable for use as the turntable of a phonograph mechanism; Fig. 2 is a partially cross-sectioned elevational view illustrating certain details of construction of the Fig. 1 reel; and Figure 3 is a fragmentary detail view illustrating the configuration of the notches of the Fig. 1 reel.

Referring now more particularly to Figs. 1 and 2 of the drawing, there is illustrated only a portion of the magnetic wire recorder; namely, its spindle 10 and turntable 11 for positioning and rotary supporting a take-up reel 12. The reel 12 is of disc-like configuration and has a circumferential groove 13 for receiving a multiplicity of turns of magnetic wire 14 which is supplied to the take-up reel, during normal operation of the recorder, from a storage reel 15 which is here shown as having been removed from the storage-reel spindle of the recorder. The take-up reel 12 has a central orifice 16 to receive the spindle 10 of the recorder.

In using a magnetic recorder, it has been pointed out above that it frequently is desirable to terminate the record or play-back operation after only a portion of the wire from the storage reel 15 has been wound upon the take-up reel 12. In these situations, it is the purpose of the present invention to avoid the necessity of rewinding the wire upon the storage reel 15 in order that this reel of wire may be replaced by another which it is desired to use. To this end, the invention contemplates that the take-up reel 12 shall have provision for assembling the storage and take-up reels in nested relation in order that they may be readily removed from the magnetic recorder either for a temporary period or for storage purposes. As illustrative of a suitable construction for this purpose, an annular depression 17 is formed in the upper face of the take-up reel 12 and provides adjacent the orifice 16 a concentric cylindrical surface or hub 18 to receive a centrally positioned bore 19 of the storage reel 15 when the latter is positioned within the depression 17 in nested relation with the take-up reel 12.

The take-up reel 12 also has in its upper face a plurality of grooves or notches 20, each arranged at an angle to a radius of the take-up reel and extending from the periphery of the take-up reel to its annular depression 17, to receive and anchor a length of the unbroken wire 14 wound upon both the storage reel 15 and the take-up reel 12. As indicated more clearly by the fragmentary detail view of Fig. 3, each of the notches 20 has smoothly flared ends with the radius of curvature of the flared portion much larger than the diameter of the wire 14. This large radius of curvature avoids the formation of any permanent bend or set in the magnetic wire 14 which would otherwise be produced should the wire be bent at such a sharp angle as to exceed its elastic limit. Each notch 20 preferably has a triangular cross-sectional configuration to facilitate positioning of the wire 14 in a selected notch and the removal of the wire therefrom.

The take-up reel 12 also includes means for engaging the storage reel 15 when the latter is in nested relation with the take-up reel to restrain the tendency of the wire 14 to cause relative angular rotation of the reels in their nested relation. This means comprises a member or shoe 22 which extends through an aperture 24 in a wall of the hub 18 and is affixed to a splitring type of spring member 23 used to bias the member 22 into frictional engagement with the surface of the bore 19 of the storage reel 15.

The take-up reel 12 is illustrated as suitable for use as the turntable of a phonograph mechanism. To this end, the upper surface of the reel 12 between the grooves 20 is covered with felt or a suitable flocculent material 25 cemented to the surface of the reel in conventional manner.

In operation, assume that the storage reel 15 and the take-up reel 12 are initially positioned in operative relation on a magnetic recorder, that a recording or play-back operation is interrupted at a time when the wire 14 is partially wound upon both of the reels 12 and 15, and that it is desired to remove the wire for storage or for exchange for a new supply of wire. The storage reel 15 is first removed from its spindle of the recorder, and is then inserted on the hub 18 of the take-up reel 12 to lie in nested relation with the latter, the wire 14 being manually grasped and pulled out in a taut loop between the reels 12 and 15 during this operation. The reel 15 is next manually rotated to take up the wire of the loop last mentioned, thus ultimately to position the wire 14 in one of the grooves or notches 20 with the wire stretched tautly between the reels 12 and 15. The wire, being of steel, tends to rotate the storage reel 15 relative to the reel 12 like a clock-spring mechanism but is restrained from doing so by the frictional engagement between the member 22 and the inner surface of the bore 19 of the spool 15. At the same time, the member 22 keeps the storage reel 15 from slipping off the hub 18 of the take-up reel 12. The reels 12 and 15 may thereafter be lifted as a unitary structure from the spindle 10 and turntable 11 of the recorder to be placed temporarily aside or to be stored away. The wire is subsequently returned to service on the recorder by reversing the order of the operations last described.

It will be apparent from the foregoing description of the invention that a wire reel embodying the invention is of simple and inexpensive construction and that it readily permits the interruption of the wire-transfer operation of a magnetic recorder at any time and the removal of both the storage and take-up reels for storage or exchange for a new pair of reels. At the same time, the wire which is partially wound upon both of the reels is firmly retained in place thereon.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A wire reel for a magnetic-wire recorder, having a spindle for positioning and rotatably supporting the reel, comprising: a disc-like reel having a circumferential groove to receive a multiplicity of turns of magnetic wire, a central orifice to receive said spindle, and a concentric surface to receive and position a second wire reel in assembled concentric relation with said first reel; said first reel also having a notched surface to receive and anchor a length of unbroken wire wound upon both of said reels; and means carried by said first reel for engaging said second reel when said reels are in said assembled relation to restrain the tendency of said wire to cause relative angular rotation of said reels in said assembled relation.

2. A wire reel for a magnetic-wire recorder, having a spindle for positioning and rotatably supporting the reel, comprising: a disc-like reel having a circumferential groove to receive a multiplicity of turns of magnetic wire, a central orifice to receive said spindle, and a concentric cylindrical surface to receive a centrally positioned bore of a second wire reel to position said second reel in assembled concentric relation with said first reel; said first reel also having a notched surface to receive and anchor a length of unbroken wire wound upon both of said reels; and means carried by said first reel for engaging said second reel when said reels are in said assembled relation to restrain the tendency of said wire to cause relative angular rotation of said reels in said assembled relation.

3. A wire reel for a magnetic-wire recorder, having a spindle for positioning and rotatably supporting the reel, comprising: a disc-like reel having a circumferential groove to receive a multiplicity of turns of magnetic wire, a central orifice to receive said spindle, and a concentric surface to receive and position a second wire reel in assembled concentric relation with said first reel; said first reel also having a notched surface to receive and anchor a length of unbroken wire wound upon both of said reels; and a spring-biased member carried by said first reel for frictionally engaging said second reel when said reels are in said assembled relation to restrain the tendency of said wire to cause relative angular rotation of said reels in said assembled relation.

4. A wire reel for a magnetic-wire recorder, having a spindle for positioning and rotatably supporting the reel, comprising: a disc-like reel having a circumferential groove to receive a multiplicity of turns of magnetic wire and a central orifice to receive said spindle, said reel having in one face thereof an annular depression to receive a second wire reel of smaller diameter than said first reel and also having in said one face thereof at least one notch extending from the periphery of said first reel to said annular depression to receive and anchor a length of unbroken wire wound upon both of said reels; and means carried by said first reel for engaging said second reel when said second reel is positioned in said depression to restrain the tendency of said wire when wound taut between said reels to cause relative angular rotation thereof.

5. A wire reel for a magnetic-wire recorder, having a spindle for positioning and rotatably supporting the reel, comprising: a disc-like reel having a circumferential groove to receive a multiplicity of turns of magnetic wire and a central orifice to receive said spindle, said reel having in one face thereof an annular depression to receive a second wire reel of smaller diameter than said first reel and also having in said one face thereof at least one notch extending from the periphery of said first reel to said annular depression to receive and anchor a length of unbroken wire wound upon both of said reels; and a spring-biased member carried by said first reel for frictionally engaging said second reel when said second reel is positioned in said depression to restrain the tendency of said wire when wound taut between said reels to cause relative angular rotation thereof.

6. A wire reel for a magnetic-wire recorder, having a spindle for positioning and rotatably supporting the reel, comprising: a disc-like reel having a circumferential groove to receive a multiplicity of turns of magnetic wire and a central orifice to receive said spindle, said reel having in one face thereof an annular depression to receive a second wire reel of smaller diameter than said first reel and also having in said one face thereof at least one notch extending at an angle to a radius from the periphery of said first reel to said annular depression to receive and anchor a length of unbroken wire wound upon both of said reels; and means carried by said first reel for engaging said second reel when said second reel is positioned in said depression to restrain the tendency of said wire when wound taut between said reels to cause relative angular rotation thereof.

7. A wire reel for a magnetic-wire recording, having a spindle for positioning and rotatably supporting the reel, comprising: a disc-like reel having a circumferential groove to receive a multiplicity of turns of magnetic wire and a central orifice to receive said spindle, said reel having in one face thereof an annular depression to receive a second wire reel of smaller diameter than said first reel and also having in said one face thereof at least one notch extending from the periphery of said first reel to said annular depression to receive and anchor a length of unbroken wire wound upon both of said reels; each said notch having smoothly flared ends of radius of curvature much larger than the diameter of said wire; and means carried by said first reel for engaging said second reel when said second reel is positioned in said depression to restrain the tendency of said wire when wound taut between said reels to cause relative angular rotation thereof.

8. A wire reel for a magnetic-wire recorder, having a spindle for positioning and rotatably supporting the reel, comprising: a disc-like reel having a circumferential groove to receive a multiplicity of turns of magnetic wire and having a central orifice to receive said spindle, said reel having in one face thereof an annular depression providing adjacent said orifice a concentric cylindrical surface to receive a centrally positioned bore of a smaller-diameter second wire reel when said second reel is positioned within said depression in nested relation with said first reel, said first reel also having in said one face thereof at least one groove extending from the periphery of said first reel to said annular depression to receive and anchor a length of unbroken wire wound upon both of said reels; and means carried by said first reel for engaging said second reel when said second reel is in said nested relation with said first reel to restrain the tendency of said wire to cause relative angular rotation of said reels in said nested relation.

9. A wire reel for a magnetic-wire recorder, having a spindle for positioning and rotatably supporting the reel, comprising: a disc-like reel having a circumferential groove to receive a multiplicity of turns of magnetic wire and having a central orifice to receive said spindle, said reel having in one face thereof an annular depression providing adjacent said orifice a concentric cylindrical surface to receive a centrally positioned bore of a smaller-diameter second wire reel when said second reel is positioned within said depression in nested relation with said first reel, said first reel also having in said one face thereof a plurality of grooves angularly extending from the periphery of said first reel to said annular depression to receive and anchor a length of unbroken wire wound upon both of said reels; and a spring-biased member carried by said first reel for frictionally engaging the surface of the bore of said second reel when said second reel is in said nested relation with said first reel to restrain the tendency of said wire when wound taut between said reels to cause relative angular rotation of said reels in said nested relation.

HOWARD L. RUMSEY.
MATTHEW C. ABBOTT.

References Cited in the file of this patent

UNITED STATES PATENTS

| Number | Name | Date |
|---|---|---|
| 1,926,836 | Corlett | Sept. 12, 1933 |
| 2,288,983 | Weiss | July 7, 1942 |
| 2,428,002 | Barrett | Sept. 30, 1947 |
| 2,463,001 | Shrader | Mar. 1, 1949 |
| 2,482,887 | Wade | Sept. 27, 1949 |